(12) United States Patent
Lee (10) Patent No.: US 8,938,323 B2
(45) Date of Patent: Jan. 20, 2015

(54) POWER STORAGE SYSTEM AND METHOD OF CONTROLLING THE SAME

(75) Inventor: Sung-Im Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 759 days.

(21) Appl. No.: 12/980,224

(22) Filed: Dec. 28, 2010

(65) Prior Publication Data

US 2011/0208370 A1      Aug. 25, 2011

(30) Foreign Application Priority Data

Feb. 25, 2010   (KR) .................. 10-2010-0017194

(51) Int. Cl.
 *G05D 3/12*    (2006.01)
 *G06F 1/30*    (2006.01)
 *H02J 7/00*    (2006.01)
 *H02J 9/06*    (2006.01)

(52) U.S. Cl.
 CPC ............ *G06F 1/30* (2013.01); *H02J 7/0075* (2013.01); *H02J 9/062* (2013.01)
 USPC ...................... 700/297; 700/291; 700/295

(58) Field of Classification Search
 USPC .................. 700/291, 295, 297, 298
 See application file for complete search history.

(56) References Cited

U.S. PATENT DOCUMENTS

| 6,198,176 B1 * | 3/2001 | Gillette ........................... 307/64 |
| 6,304,006 B1 * | 10/2001 | Jungreis .......................... 307/64 |
| 6,487,096 B1 * | 11/2002 | Gilbreth et al. ................ 363/35 |
| 6,680,547 B1 * | 1/2004 | Dailey ............................ 307/31 |
| 6,774,602 B2 * | 8/2004 | Ballard et al. ................ 320/103 |
| 2002/0163819 A1 * | 11/2002 | Treece ............................ 363/34 |
| 2003/0047209 A1 * | 3/2003 | Yanai et al. ................... 136/291 |
| 2008/0088183 A1 * | 4/2008 | Eckroad et al. ................ 307/66 |
| 2010/0127576 A1 * | 5/2010 | Ahlborn et al. .............. 307/151 |

(Continued)

FOREIGN PATENT DOCUMENTS

| JP | 08-223816 | 8/1996 |
| JP | 10-336916 | 12/1998 |
| JP | 2000-308370 | 11/2000 |

(Continued)

OTHER PUBLICATIONS

KIPO Office action dated May 17, 2011, for Korean priority Patent application 10-2010-0017194, noting listed references in this IDS.

(Continued)

*Primary Examiner* — Carlos Ortiz Rodriguez
(74) *Attorney, Agent, or Firm* — Christie, Parker & Hale, LLP (57) ABSTRACT

A method of controlling a power storage system for supplying power to a load from a power generation system, a battery, and a grid includes: when power failure occurs in the grid, determining whether duration of the power failure is more than a standard duration; if the duration of the power failure is more than the standard duration, determining a state of charge of the battery; and when the power failure of the grid has ended, if the duration of the power failure is less than the standard duration or if the state of charge of the battery is equal or more than a standard value, performing a first power failure returning mode; and if the charging condition of the battery is less than the standard value, performing a second power failure returning mode. Accordingly, the power storage system performs a stable operation and prevents lifespan shortening of the battery.

24 Claims, 5 Drawing Sheets

(56) References Cited

U.S. PATENT DOCUMENTS

2010/0198421 A1* 8/2010 Fahimi et al. ............... 700/291
2011/0304295 A1* 12/2011 McNally .................... 320/101

FOREIGN PATENT DOCUMENTS

| | | |
|---|---|---|
| JP | 2001-224142 | 8/2001 |
| JP | 2002-270876 | 9/2002 |
| JP | 2003-092844 | 3/2003 |
| JP | 2003-348768 | 12/2003 |
| JP | 2006-524332 | 10/2006 |
| JP | 2008-054473 | 3/2008 |
| KR | 10-2006-0017944 | 2/2006 |
| KR | 10-2009-0085973 | 8/2009 |
| WO | WO 2004/099791 A2 | 11/2004 |

OTHER PUBLICATIONS

Patent Abstracts of Japan, and English machine translation for Japanese Publication 2003-092844, listed above, 39 pages.
Patent Abstracts of Japan, and English machine translation for Japanese Publication 2003-348768, listed above, 29 pages.

* cited by examiner

POWER STORAGE SYSTEM AND METHOD OF CONTROLLING THE SAME

CROSS-REFERENCE TO RELATED APPLICATION

This application claims the benefit of Korean Patent Application No. 10-2010-0017194, filed Feb. 25, 2010 in the Korean Intellectual Property Office, the disclosure of which is incorporated herein by reference.

BACKGROUND

1. Field

One or more embodiments of the present invention relate to a power storage system and a method of controlling the same, and more particularly, to a grid-connected power storage system and a method of controlling the grid-connected power storage system.

2. Description of the Related Art

Due to environmental problems, such as destruction of the environment and exhaustion of resources, becoming more serious, a system capable of storing power and effectively utilizing the stored power has recently attracted much attention. In addition, renewable energy, which does not cause pollution during power generation, has also been attracting much attention. Power storage systems have recently undergone much research in response to today's environmental changes. Power storage systems connect renewable energy, a power stored in a battery, and power existing in a grid.

SUMMARY

One or more embodiments of the present invention include a power storage system that can operate stably after power failure has occurred in a grid and can prevent life shortening, and a method of controlling the power storage system.

According to one or more embodiments of the present invention, a method of controlling a power storage system which supplies power to a load by connecting a power generation system, a battery, and a grid, the method includes: when a power failure occurs in the grid, determining whether a duration of the power failure between a beginning and an end of the power failure is more than a standard duration; if the duration of the power failure is equal or more than the standard duration, determining whether a charging condition of the battery indicates that a state of charge of the battery is equal to or greater than a standard value; if the duration of the power failure is less than the standard duration or if the duration of the power failure is more than the standard duration and the state of charge of the battery is equal to or more than the standard value, performing a first power failure returning mode; and if the duration of the power failure is more than the standard duration and the state of charge of the battery is less than the standard value, performing a second power failure returning mode.

According to an aspect of the invention, the first power failure returning mode may include: stopping a supply of power from the power generation system or the battery to the grid for a predetermined period of time; matching a phase of the power generated by the power generation system with a phase of power of the grid; and after the predetermined period of time has passed, supplying the power generated by the power generation system to the grid or the load.

According to an aspect of the invention, the second power failure returning mode may include: determining an amount of power consumption of the load; when the amount of power consumption of the load is equal to or more than a standard load value, returning to the first power failure returning mode; and when the amount of power consumption of the load is less than the standard load value, charging the battery.

According to an aspect of the invention, the second power failure returning mode may include: determining whether the power generation system is generating power; and when the power generation system is generating power, comparing an amount of power generated by the power generation system and an amount of power required to charge the battery.

According to an aspect of the invention, the second power failure returning mode may further include: when the amount of the power generated by the power generation system is equal to or more than the amount of power required to charge the battery, charging the battery by using the power generated by the power generation system, and supplying surplus power remaining after the charging of the battery, from among the power generated by the power generation system, to the load or the grid.

According to an aspect of the invention, the second power failure returning mode may further include: when the amount of the power generated in the power generation system is less than the amount of power required to charge the battery, charging the battery by using the power generated in the power generation system and a power of the grid.

According to an aspect of the invention, the second power failure returning mode may include: determining whether the power generation system is generating power; and when the power generation system is not generating power, charging the battery by using power of the grid.

According to an aspect of the invention, the first power failure returning mode includes returning the power storage system to a state which existed prior to the power failure and without charging the battery; and the second power failure returning mode includes returning the power storage system to the state which existed prior to the power failure and charging the battery.

According to one or more embodiments of the present invention, a power storage system for supplying power to a load and which connects the load to a power generation system, a battery, and a grid, the power storage system includes: a battery management system which controls a charging and a discharging of the battery and which determines a state of charge of the battery; and an central controller comprising a duration determination unit which determines a duration of a power failure which occurred in the grid, and, when the power failure in the grid has ended, performs a power failure returning mode selected from multiple power failure returning modes according to the determined duration of the power failure and the determined state of charge of the battery.

According to an aspect of the invention, when the determined duration of the power failure is less than a standard duration or when the determined state of charge of the battery is equal to or more than a standard value, the central controller may select and perform a power failure returning mode in which a supply of power from the power generation system or the battery to the grid is stopped for a predetermined period of time.

According to an aspect of the invention, when the determined duration of the power failure is equal to or more than a standard duration and when the determined state of charge of the battery is less than a standard value, the central controller may select and perform a power failure returning mode in which the battery is charged by using power of the power generation system or the grid.

According to an aspect of the invention, the central controller may further include a power consumption determination unit which determines an amount of power consumption of the load, when the determined amount of power consumption of the load is equal to or more than a standard value, the central controller may perform a first power failure returning mode in which a supply of power from the battery to the grid is stopped for a predetermined period of time, and when the determined amount of power consumption of the load is less than the standard value, the central controller may perform a second power failure returning mode in which the battery is charged by using power generated by the power generation system or power of the grid.

According to an aspect of the invention, the central controller may detect an amount of the power generated by the power generation system in the second power failure returning mode, and when the detected amount of the power generated in the power generation system is equal to or more than an amount of power required to charge the battery, may control the power storage system to charge the battery by using the power generated by the power generation system and to supply surplus power remaining after the charging of the battery, from among the power generated by the power generation system, to the load or the grid.

According to an aspect of the invention, the central controller may detect an amount of the power generated in the power generation system in the second power failure returning mode, and when the detected amount of the power generated in the power generation system is less than an amount of power required to charge the battery, may control the power storage system to charge the battery by using the power generated in the power generation system and the power of the grid.

According to an aspect of the invention, the central controller may detect an amount of the power generated by the power generation system in the second power failure returning mode, and when the power generation system is not generating power, may control the power storage system to charge the battery by using the power of the grid.

According to an aspect of the invention, one of the power failure returning modes includes returning the power storage system to a state which existed prior to the power failure and without charging the battery; and another one of the power failure returning modes includes returning the power storage system to the state which existed prior to the power failure and charging the battery.

According to one or more embodiments of the present invention, provided is a computer readable recording medium having embodied thereon a computer program for executing the method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
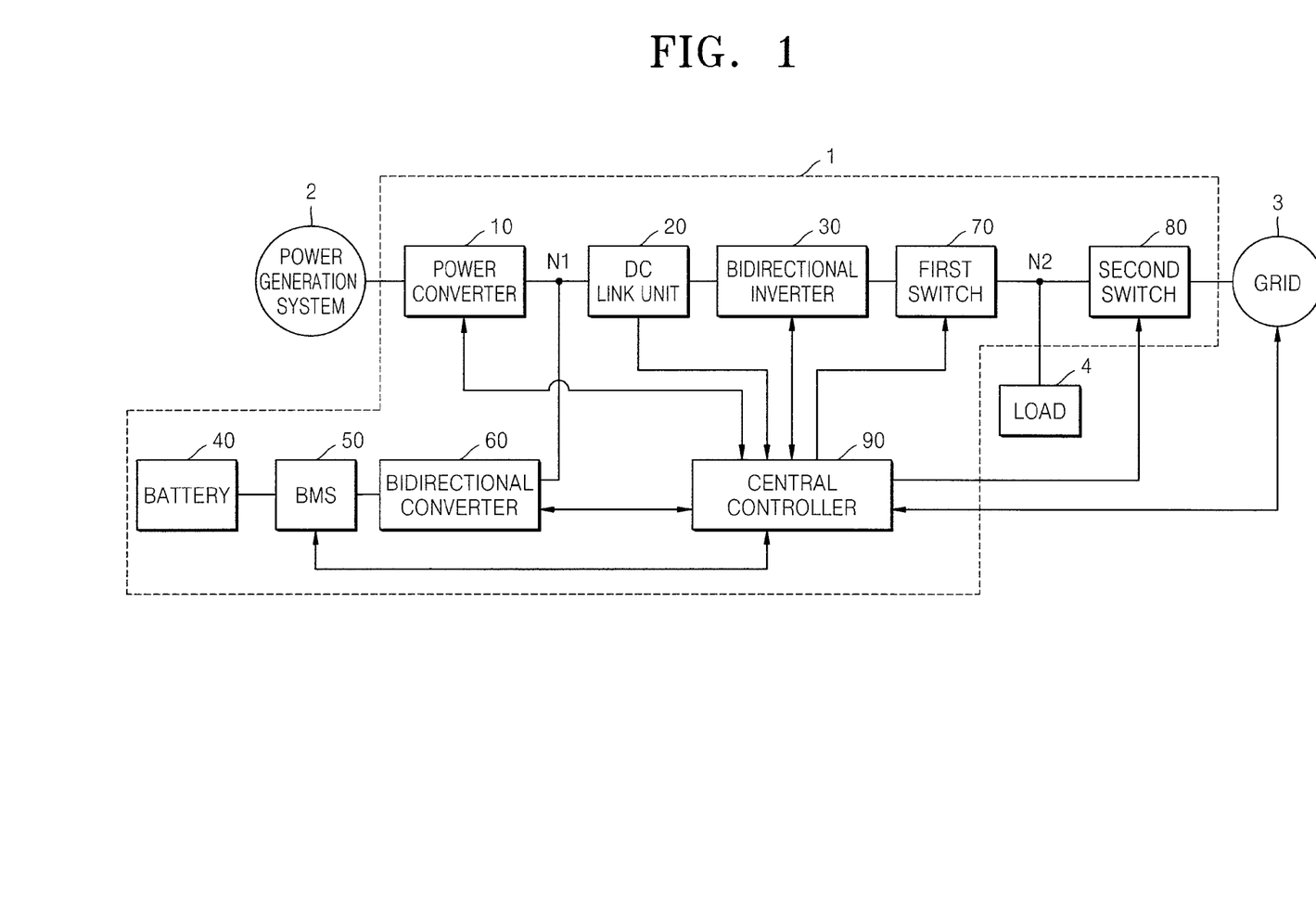
FIG. 1 is a block diagram of a power storage system, according to an embodiment of the present invention.
Figure 2:
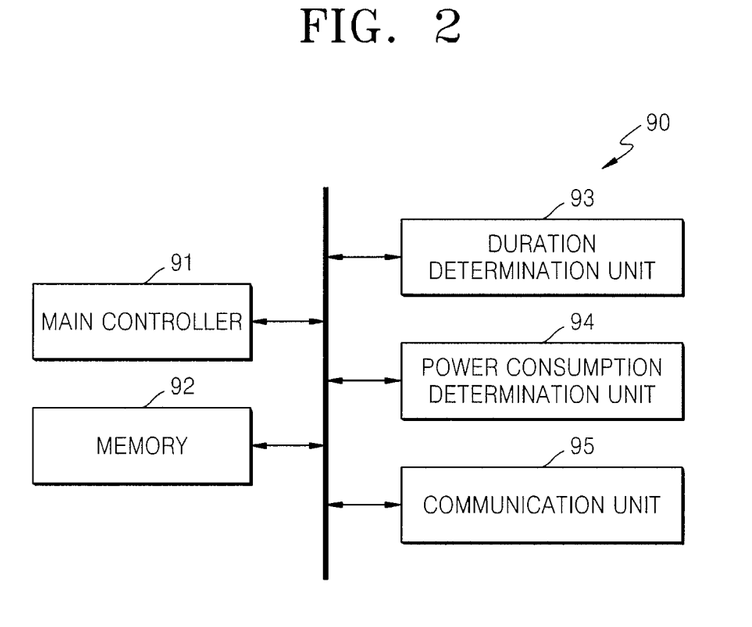
FIG. 2 is a block diagram of a central controller, according to an embodiment of the present invention.

FIG. 1 is a block diagram of a power storage system 1, according to an embodiment of the present invention. FIG. 2 is a block diagram of a central controller 90, according to an embodiment of the present invention. Referring to FIG. 1, the power storage system 1 is connected to a power generation system 2 and a grid 3 so as to supply power to the load 4.

The power generation system 2 generates power by using an energy source. The power generation system 2 supplies the generated power to the power storage system 1. The power generation system 2 may be a sunlight power generation system, a wind power generation system, a tidal power generation system, or the like; however, any power generation system for generating power from renewable energy, such as solar heat or geothermal heat, may be used. In particular, a solar cell for generating electric energy from sunlight may be easily installed in a house or a factory, and may be appropriate for the power generation system 2. The power generation system 2 includes a plurality of power generation modules formed in parallel and generates power from each power generation module, thereby forming a large-capacity energy system.

The grid 3 includes a power plant, a substation, a power cable, etc. When the grid 3 is in a normal state, the grid 3 supplies power to the power storage system 1 or a load 4 and receives power supplied from the power storage system 1. When the grid is in an abnormal state, the grid 3 stops supplying power to the power storage system 1 or the load 4, and power supplied from the power storage system 1 to the grid 3 is also stopped. An example of the abnormal state is a power failure, but the invention is not limited thereto.

The load 4 consumes power generated by the power generation system 2, power stored in a battery 40, or power supplied from the grid 3. The load 4 may be a house, a factory, an office complex, an electric vehicle, etc.

The power storage system 1 is capable of storing power generated by the power generation system 2 in the battery 40 and sends the generated power to the grid 3. Also, the power storage system 1 is also capable of sending the power stored in the battery 40 to the grid 3 or storing the power supplied from the grid 3 in the battery 40. When the grid 3 is in an abnormal state (for example, the power failure state), the power storage system 1 may perform an uninterruptible power supply (UPS) operation so as to supply power to the load 4. Even when the grid 3 is in a normal state, the power storage system 1 may supply the generated power or the power stored in the battery 40 to the load 4. The power storage system 1 can be included in a house or factory having the load 4 and/or the power generation system 2, such as a solar cell which supplies power to the load 4 of the house or factory.

The power storage system 1 includes a power converter 10, a direct current (DC) link unit 20, a bidirectional inverter 30, the battery 40, a battery management system (BMS) 50, a bidirectional converter 60, a first switch 70, a second switch 80, and the central controller 90.

The power converter 10 is connected between the power generation system 2 and a first node N1. The power converter 10 sends power generated by the power generation system 2 to the first node N1, and more specifically, a voltage output from the power generation system 2 is converted into a DC link voltage. While not required in all aspects, the power converter 10 may be a converter or a rectification circuit according to the type of the power generation system 2. That is, when the power generation system 2 generates DC power, the power converter 10 may be a converter for converting the DC power into another DC power. Alternatively, when the power generation system 2 generates AC power, the power converter 10 may be a rectification circuit for converting the AC power into DC power. In particular, when the power generation system 2 generates power from sunlight, the power converter 10 may be a maximum power point tracking (MPPT) converter that performs MPPT control in order to maximize the amount of power generated by the power generation system 2 according to changes of the amount of solar radiation, temperature, or the like.

The DC link unit 20 is connected between the first node N1 and the bidirectional inverter 30 so as to maintain a constant DC link voltage at the first node N1. The first node N1 may be at an unstable voltage level due to an instantaneous voltage drop of the power generation system 2 or the grid 3, or due to a peak load generated in the load 4. However, the voltage of the first node N1 is required to be stable for normal operations of the bidirectional converter 60 and the bidirectional inverter 30. The DC link unit 20 may be provided for stabilization of the DC link voltage level. For example, the DC link unit 20 may be a capacitor. The capacitor may be an aluminum electrolytic capacitor, a polymer capacitor, or a multi layer ceramic capacitor (MLCC). In the current embodiment, the DC link unit 20 is disposed separately from other elements. However, the DC link unit 20 may be included inside the bidirectional converter 60, the bidirectional inverter 30, or the power converter 10.

The bidirectional inverter 30 is a power converter connected between the DC link unit 20 and the first switch 70. The bidirectional inverter 30 converts a DC link voltage that is output from the power generation system 2 or the battery 40 into an AC voltage for the grid 3, and outputs the AC voltage. Also, the bidirectional inverter 30 rectifies the AC voltage of the grid 3, converts the AC voltage into a DC link voltage, and outputs the DC link voltage, in order to store power from the grid 3 in the battery 40. The bidirectional inverter 30 may include a filter for removing harmonic distortion from the AC voltage that is output from the grid 3. The bidirectional inverter 30 may also include a phase locked loop (PLL) circuit for synchronizing a phase of the AC voltage that is output from the bidirectional inverter 30 and a phase of the AC voltage of the grid 3, in order to prevent generation of reactive power. In addition, the bidirectional inverter 30 may perform functions, such as, limiting a voltage range from changing, improving a power factor, eliminating DC components, protecting against transient phenomena, etc.

The battery 40 receives and stores power generated by the power generation system 2 and power from the grid 3, and supplies power stored to the load 4 or the grid 3. The battery 40 may include at least one battery cell, and each battery cell may include a plurality of bare cells. The battery 40 may include any of various kinds of battery cells. For example, the battery 40 can be a nickel-cadmium battery, a lead storage battery, a nickel metal hydride (NiMH) battery, a lithium ion battery, a lithium polymer battery, or the like. There may be a number of batteries 40 according to power capacity required in the power storage system 1, a design condition, or the like. For example, when the amount of power consumption of the load 4 is relatively large, there may be a plurality of batteries 40. In contrast, when the amount of power consumption of the load 4 is relatively small, there may be only one battery 40.

The BMS 50 is connected to the battery 40 and controls the charging and discharging operations of the battery 40 under the control of the central controller 90. The BMS 50 may perform various functions, such as, overcharging protection, overdischarging protection, overcurrent protection, overvoltage protection, overheat protection, cell balancing, etc., in order to protect the battery 40. For this, the BMS 50 may monitor voltage, current, temperature, the amount of power remaining, lifespan, a state of charge, etc., with respect to the battery 40 and transmit related information to the central controller 90. In the current embodiment, the BMS 50 and the battery 40 are formed separately, but may be integrated with each other as one battery pack. While not required, the battery 40 and/or the BMS 50 could be detachable from the power storage system 1, such as where the battery 40 is replaceable and/or included in an electrical vehicle which plugs into the system 1 when not in use.

The bidirectional converter 60 DC-DC converts power output from the battery 40 into a voltage level required in the bidirectional inverter 30 (that is, a DC link voltage). The bidirectional converter 60 also DC-DC converts charging power entering through the first node N1 into a voltage level required by the battery 40. Here, the charging power may be, for example, power generated by the power generation system 2 or power supplied through the bidirectional inverter 30 from the grid 3.

The first switch 70 and the second switch 80 are connected in series with the bidirectional inverter 30 and a second node N2, and perform on/off operations under the control of the central controller 90 to control a flow of current between the power generation system 2 and the grid 3. The on/off operations of the first switch 70 and the second switch 80 may be determined according to states of the power generation system 2, the grid 3, and the battery 40. For example, when the amount of power required by the load 4 is great, both the first switch 70 and the second switch 80 are turned on, in order for the load 4 to use all the power generated by the power generation system 2 and the power from the grid 3. Of course, when the power generated in the power generation system 2 and the power from the grid 3 cannot satisfy the amount of power required by the load 4, the power stored in the battery 40 may be supplied. Meanwhile, when a power failure occurs in the grid 3, the second switch 80 is turned off and the first switch 70 is turned on. The power generated in the power generation system 2 or stored in the battery 40 may be supplied to the load 4, and thus the power supplied to the load 4 does not flow into the grid 3. This further prevents accidents, such as, an electric shock caused when a worker is working on a power line of the grid 3 during the power outage.

The central controller 90 monitors states of the power generation system 2, the grid 3, the battery 40, and the load 4. The central controller 90 controls the power converter 10, the bidirectional inverter 30, the BMS 50, the bidirectional converter 60, the first switch 70, and the second switch 80 according to a result of the monitoring. The central controller 90 may also receive a DC link voltage value from the DC link unit 20 and monitor states of the power storage system 1 and the load 4, although this is not required in all aspects.

The central controller 90 may include a main controller 91, a memory 92, a duration determination unit 93, a power consumption determination unit 94, and a communication unit 95. While not required, the main controller 91 and the duration determination unit 93, the power consumption determination unit 94, and the communication unit 95 can be implemented using one or more processors and/or computers executing software stored in the memory 92.

The main controller 91 controls each component of the central controller 90 and controls an operation of the power storage system 1 according to stored algorithms. The memory 92 stores an operation algorithm of the central controller 90, for example, a computer program regarding an operation sequence when power failure occurs in the grid 3. The memory 92 may also store information received from each component of the power storage system 1 and store a predictive value of the amount of power to be consumed by the load 4 per hour in advance. The memory 92 can be magnetic, magneto-optical and/or optical storage devices and can be detachable. Further, while shown as within the central controller 90, it is understood that the memory 92 can be connected to the central controller 90 across a wired and/or wireless network.

When a power failure occurs in the grid 3, the duration determination unit 93 determines the duration of the power failure. That is, the duration determination unit 93 measures a time taken from when the power failure started to when the power failure in the grid 3 has ended. The measuring of time may be performed by a timing generator (not shown) installed in the central controller 90 or a system clock used to operate the main controller 91. Alternatively, the duration determination unit 93 may include a clock to determine the time that power failure occurred and the duration of the power failure by using the clock.

When the grid 3 is returned from the power failure to a normal state after the power failure occurred, the power consumption determination unit 94 determines the amount of power consumption of the load 4 at the returning time. At this time, the amount of power consumption of the load 4 may be a value obtained by measuring the amount of power that is consumed in the load 4 or a value obtained by predicting the amount of power to be consumed in the load 4.

When the amount of power that is consumed in the load 4 is measured by the power consumption determination unit 94, the power storage system 1 may further include a device for measuring the power consumption of the load 4. For example, the measurement device could measure a current flowed from the second node N2 into the load 4.

When the predictive value of the power consumption of the load 4 is used in order to determine the power consumption of the load 4 in the power consumption determination unit 94, the predictive value of the power consumption may be stored in the memory 92 and extracted to be used. The predictive value of the power consumption may be a season-based or time-based predictive value. While not required, while described as separate methods, it is understood that the amount of power consumption of the load 4 can be both predicted and measured, such as where both the measured and predicted amounts are used to detect an accuracy of the measured consumption or in case of a failure of the measuring device.

The communication unit 95 may receive information from the grid 3. For example, the communication unit 95 could receive information about the amount of power generated in the grid 3, about whether an accident has occurred, etc. The central controller 90 may also transmit information about the amount of power that can be sold through the communication unit 95 as well as the measured and/or predicted power used by the load 4 or sold back into the grid 3.

Hereinafter, a method of controlling the power storage system 1 according to the current embodiment will be described with reference to FIGS. 3 through 7. First, an operation of the power storage system 1 during power failure of the grid 3 will be described. Before the power failure occurs in the grid 3, the second switch 80 is in an on-state, and the power generated in the grid 3 is supplied to the load 4. When power is generated by the power generation system 2, the generated power may also be supplied to the load 4 and/or sold back to the grid 3. At this time, the first switch 70 is in an on-state. Also, the battery 40, depending on a charging condition of the battery 40, may receive power from the power generation system 2 or the grid 3 to store the power, and supply the power to the load 4.

When the power failure occurs in the grid 3, the central controller 90 switches the second switch 80 into an off-state. When power failure occurs in the grid 3, a sudden voltage drop occurs in the second node N2, thereby causing serious problems. For example, the drop can damage to components of the power storage system 1 or the power generation system 2. Thus the switch 80 is turned off to prevent this damage.

After the second switch 80 is turned off, if the first switch 70 is in an off-state, the central controller 90 switches the first switch 70 into an on-state. If the first switch 70 is already in the on-state, the central controller 90 leaves the first switch 70 in the on-state. Then, the central controller 90 supplies power generated by the power generation system 2 to the load 4. Alternatively, when the power generation system 2 cannot generate power (for example, when the power generation system 2 generates power from sunlight and when the power failure occurs at midnight), the power stored in the battery 40 is supplied to the load 4. That is, the power generation system 2 performs an UPS operation.

Figure 3:
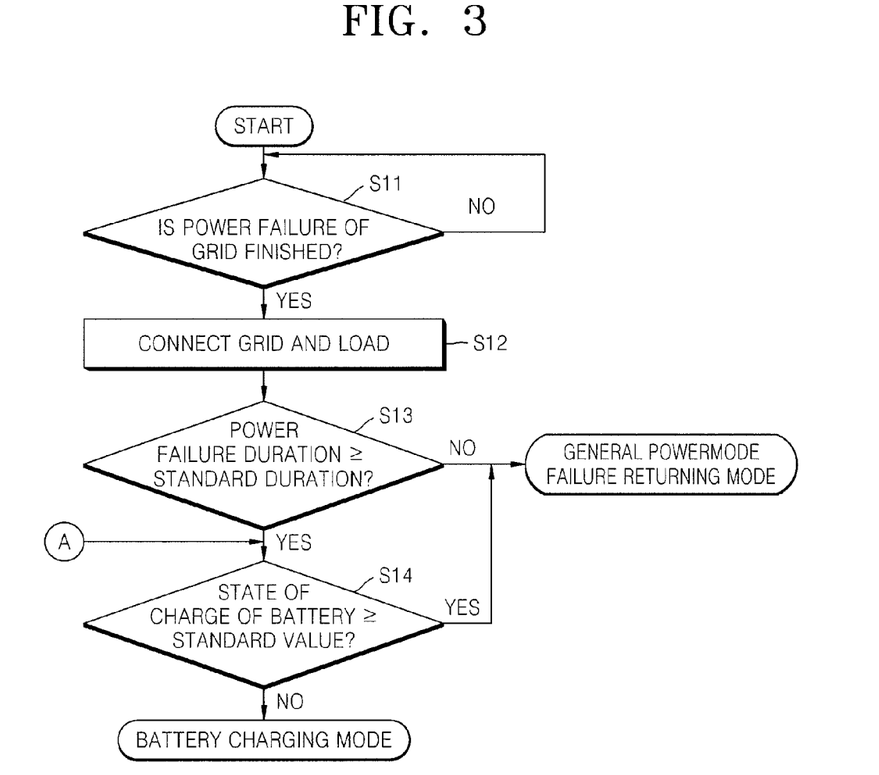
FIG. 3 is a flowchart illustrating a method of controlling a power storage system, according to an embodiment of the present invention.
Figure 4:
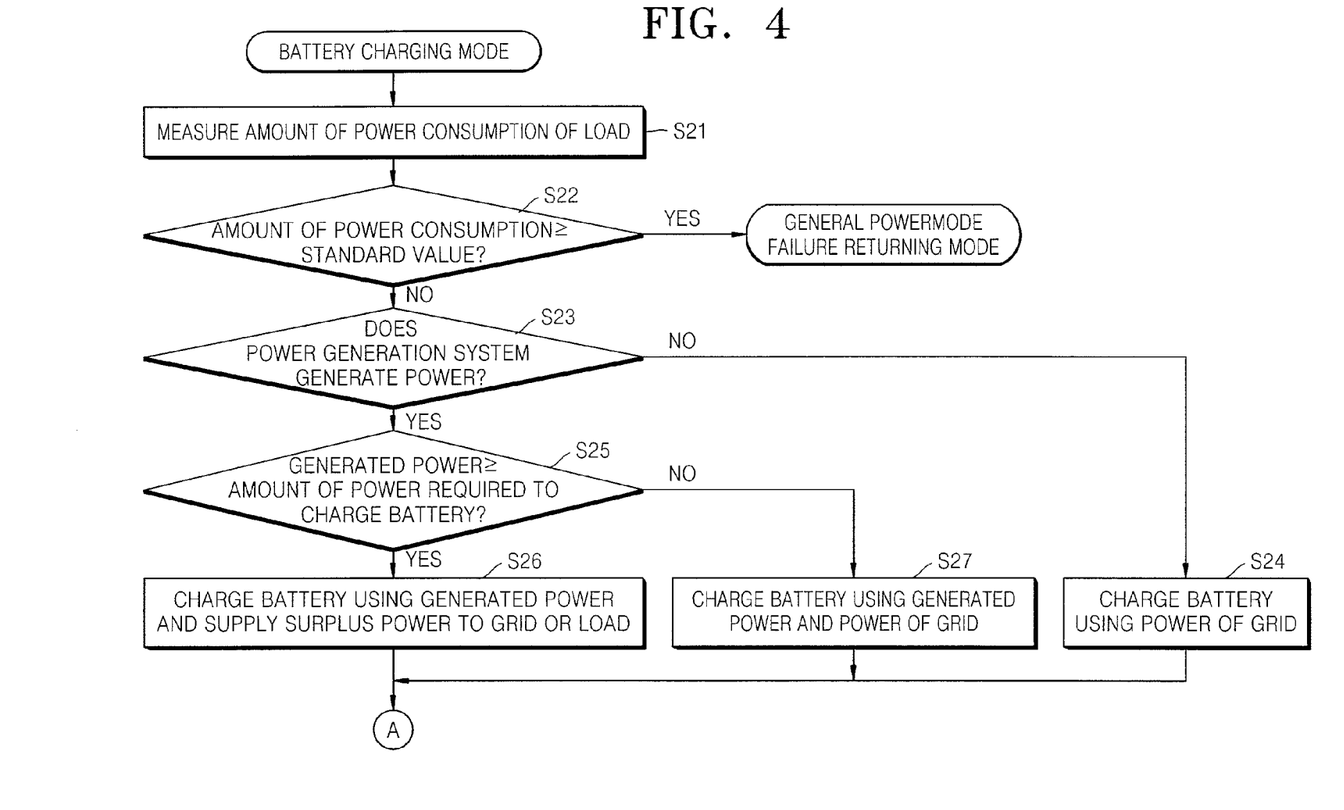
FIG. 4 is a flowchart illustrating a method of controlling a power storage system, according to another embodiment of the present invention.
Figure 5:
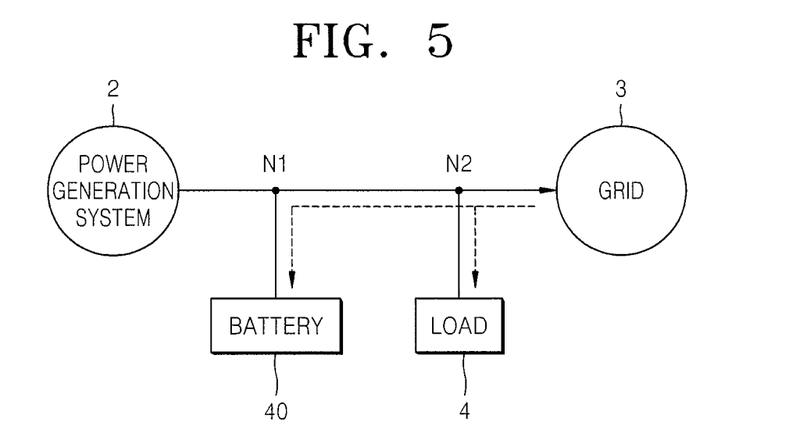
FIG. 5 is a conceptual diagram illustrating a flow of power in a power storage system, according to an embodiment of the present invention.
Figure 6:
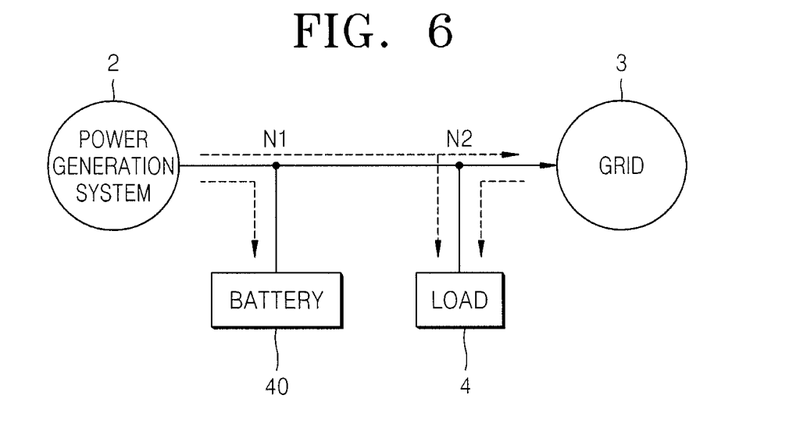
FIG. 6 is a conceptual diagram illustrating flow of power in a power storage system, according to another embodiment of the present invention.
Figure 7:
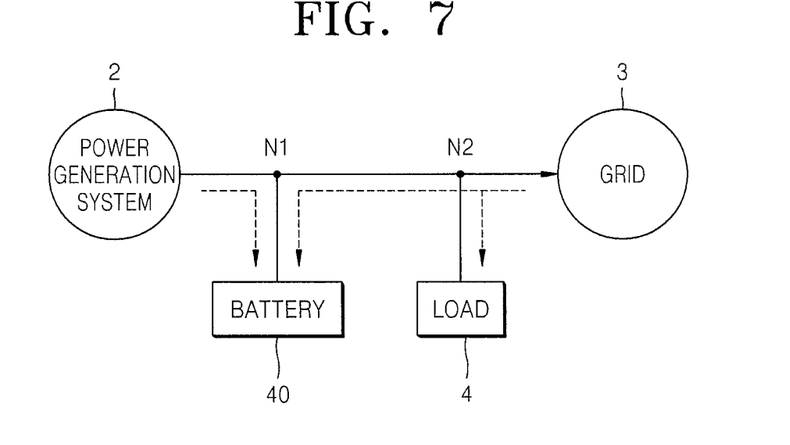
FIG. 7 is a conceptual diagram illustrating flow of power in a power storage system, according to another embodiment of the present invention.

FIGS. 3 and 4 are flowcharts illustrating a method of controlling the power storage system 1, according to embodiments of the present invention. FIGS. 5 through 7 are conceptual diagrams illustrating flow of power in the power storage system 1, according to the current embodiments of the present invention. Referring to FIG. 3, when the power failure occurs in the grid 3, the central controller 90 supplies the power generated by the power generation system 2 or the stored power from the battery 40 to the load 4 and determines whether the power failure in the grid 3 has ended (S11).

When the power failure in the grid 3 has ended, the central controller 90 turns on the second switch 80 and connects the grid 3 to the load 4 (S12). That is, the power is supplied from the grid 3 to the load 4.

Also, when the power failure in the grid 3 has ended, the duration determination unit 93 measures the duration of the power failure occurred in the grid 3, and sends the result to the main controller 91. The main controller 91 determines whether the measured duration of the power failure is greater than a standard duration (S13). That is, the main controller 91 determines whether the power failure occurred in the grid 3 is an instantaneous power failure which occurred for only a short time, or a permanent power failure which occurred for a long time. An example of an instantaneous power failure includes when the duration of the power failure is less than several seconds."

When the duration of the power failure is less than a standard duration (that is, when the power failure occurred in the grid 3 is the instantaneous power failure), a general power failure returning mode is performed. The general power failure returning mode is a mode in which the power storage system 1 is returned to a state before the power failure had occurred. In the general power failure returning mode, the power generated in the grid 3 is supplied to the load 4 and the supply of the power generated by the power generation system 2 to the load 4 is stopped. Thus, the supply of the power from the battery 40 that was supplied to the load 4 during the power failure is stopped. That is, the first switch 70 is turned off so as to stop the supply of power from the power generation system 2 to the load 4, while supplying the power from the grid 3 to the load 4 as the second switch 80 remains on.

After the supply of power from the power generation system 2 and the battery 40 is stopped for a predetermined period of time, when another power in addition to the power from the grid 3 is required due to a large amount of power consumption of the load 4 or where power is to be sold back to the grid 3, the power generated by the power generation system 2 or stored in the battery 40 is supplied to the load 4 or sold to the grid 3. At this time, DC power generated by the power generation system 2 or stored in the battery 40 is converted into AC power by using the bidirectional inverter 30, and the power from the grid 3 and phase thereof are matched with the AC power converted and phase thereof, respectively. When phases of both the powers become the same by the bidirectional inverter 30, power that is output from the bidirectional inverter 30 is supplied to the load 4 or the grid 3. That is, the power storage system 1 is changed into a standby mode.

Meanwhile, when the duration of the power failure is more than a standard duration (that is, when the power failure is a permanent power failure), a state of charge of the battery 40 is measured. It is then determined whether the state of charge of the battery 40 is more than a standard value (S14). Conventionally, the battery 40 is frequently charged. That is, even when some amount of power is supplied from the battery 40 to the load 4, a charging operation is performed so that the battery 40 may be fully charged by using the power generated in the power generation system 2 or the grid 3. However, frequent charging and discharging operations reduce the lifespan of the battery 40. Accordingly, even though the power failure occurred, the power of the battery 40 may not be used or used much. Thus, the state of charge of the battery 40 is determined when the grid 3 is returned from the power failure. At this time, the standard value may vary according to the type of the battery 40, duration of use of the battery 40, etc. The central controller 90 may receive information about the state of charge of the battery 40 from the BMS 50.

When the state of charge of the battery 40 is more than a standard value (for example, more than 90%), it is determined that the battery 40 does not need to be recharged, and then, the general power failure returning mode is performed without performing a battery charging mode.

When the state of charge of the battery 40 is less than a standard value, the battery charging mode is performed. The battery charging mode is the same as the general power failure returning mode, in terms of converting the state of the second switch 80 into an on-state in order to supply the power of the grid 3 to the load 4. However, since the amount of power stored in the battery 40 is insufficient, the battery charging mode is a mode in which operations for supplying power to the load 4 and for charging the battery 40 are performed at the same time.

Hereinafter, the battery charging mode will be described in detail with reference to FIG. 4. Referring to FIG. 4, when the power failure continues for more than a standard duration, and also when a state of charge of the battery 40 is less than a standard value, the power consumption determination unit 94 measures the amount of power consumption of the load 4 (S21). This, as described above, may be an operation for measuring the amount of power that is actually consumed in the load 4, or may be a predicted value of the amount of power consumption of the load 4.

The main controller 91 compares the measured amount of power consumption of the load 4 with a standard value (S22). When the amount of power consumption of the load 4 is more than the standard value, a general power failure returning mode is performed. When the amount of power consumption of the load 4 is a maximum (for example, when the power failure returning time is daytime in the middle of summer and when a large amount of power is consumed due to usage of an air conditioner), it may not be easy to charge the battery 40 by using the power of the grid 3. Accordingly, the general power failure returning mode is performed first, so as to put the power storage system 1 into a standby state.

When the amount of power consumption of the load 4 is less than a standard value, it is determined whether the power generation system 2 generates power (S23). When the power generation system 2 does not generate power, the battery 40 is charged by using the power of the grid 3 (S24). At this time, the state of the first switch 70 is converted into an on-state. Referring to FIG. 5, since the power generation system 2 does not generate power, the power of the grid 3 is supplied to the load 4, and extra power is supplied to the battery 40 so as to charge the battery 40.

When the power generation system 2 generates power, it is determined whether the amount of generated power is more than the amount of power required to charge the battery 40 (S25).

When the amount of generated power is more than the amount of power required to charge the battery 40, the battery 40 is charged by using power generated by the power generation system 2, and surplus power remaining after the charging of the battery 40 is supplied to the grid 3 or the load 4 (S26). Accordingly, in this case, the first switch 70 is turned on. Referring to FIG. 6, the power generated by the power generation system 2 is supplied to the battery 40, and the power of the grid 3 is supplied to the load 4. Also, the surplus power remaining after the charging of the battery 40, from among the power generated by the power generation system 2, is supplied to the grid 3 and/or the load 4.

On the other hand, when the amount of generated power is less than the amount of power required to charge the battery 40, the battery 40 is charged not only by using the power generated by the power generation system 2 but also by using the power of the grid 3 (S27). At this time, the first switch 70 is turned on. Referring to FIG. 7, all the power generated by the power generation system 2 is used to charge the battery 40, and the power of the grid 3 is supplied to the load 4 and the battery 40.

When the battery 40 is charged in S24, S26 or S27, the process returns to S14 of FIG. 3. Thus, the state of charge of the battery 40 is repeatedly checked, and the battery 40 is charged until the state of charge of the battery becomes more than the standard value.

According to the above embodiment, when the grid 3 returns from a power failure, a power failure returning operation is performed according to the duration of the power failure and a state of charge of the battery 40. Thus, charging operations on the battery 40 are less frequent, thereby extending the lifespan of the battery 40. Also, in the power failure returning operation of the power storage system 1, the amount of power supplied to the load 4 may not be insufficient in consideration of the amount of power consumption of the load 4. Further, in the power failure returning operation of the power storage system 1, in addition to a general power failure returning mode, various other power failure returning operations can be performed according to various conditions, and the power failure returning operations can be performed according to a predetermined standard, thereby stably operating the power storage system 1.

Programs for executing the method of controlling the power storage system 1 according to embodiments and modified examples of the present invention may be included in software and/or firmware stored in a recording medium such as the memory 92. The recording medium may be a computer readable recording medium, and may include a semiconductor recording medium (e.g. flash memory), a magnetic storage medium (e.g., read-only memories (ROM), hard disks, etc.), an optical recording media (e.g., digital versatile discs (DVDs)), etc. For example, a program may be stored in the memory 92 of FIG. 2. The medium may be read by one or more processors (, for example, the main controller 91 of FIG. 2) and may be executed in the one or more processors.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a power storage system which supplies power to a load by connecting the load to a power generation system, a battery, and a grid, the method comprising:
   when a power failure occurs in the grid, determining whether a duration of the power failure between a beginning and an end of the power failure is more than a standard duration;
   if the duration of the power failure is more than the standard duration, determining the power failure is a permanent failure;
   if the duration of the power failure is less than the standard duration determining the power failure is an instantaneous failure,
   if the power failure is the permanent failure, determining whether a charging condition of the battery indicates that a state of charge of the battery is equal to or greater than a standard value;
   if the power failure is the permanent failure and the state of charge of the battery is equal to or more than the standard value, performing a first power failure returning mode; and
   if the power failure is the permanent failure and the state of charge of the battery is less than the standard value, performing a second power failure returning mode.

2. The method of claim 1, wherein the first power failure returning mode comprises:
   stopping a supply of power from the power generation system or the battery to the grid for a predetermined period of time;
   matching a phase of the power generated by the power generation system with a phase of power of the grid; and
   after the predetermined period of time has passed, supplying the power generated by the power generation system to the grid or the load.

3. The method of claim 1, wherein the second power failure returning mode comprises:
   determining an amount of power consumption of the load;
   when the amount of power consumption of the load is equal to or more than a standard load value, returning to the first power failure returning mode; and
   when the amount of power consumption of the load is less than the standard load value, charging the battery.

4. The method of claim 3, wherein the second power failure returning mode comprises:
   determining whether the power generation system is generating power; and
   when the power generation system is generating power, comparing an amount of power generated by the power generation system and an amount of power required to charge the battery.

5. The method of claim 4, wherein the second power failure returning mode further comprises:
   when the amount of the power generated by the power generation system is equal to or more than the amount of power required to charge the battery, charging the battery by using the power generated by the power generation system, and supplying surplus power remaining after the charging of the battery, from among the power generated by the power generation system, to the load or the grid.

6. The method of claim 4, wherein the second power failure returning mode further comprises:
   when the amount of the power generated in the power generation system is less than the amount of power required to charge the battery, charging the battery by using the power generated in the power generation system and a power of the grid.

7. The method of claim 3, wherein the second power failure returning mode comprises:
   determining whether the power generation system is generating power; and
   when the power generation system is not generating power, charging the battery by using power of the grid.

8. The method of claim 1, wherein:
   the first power failure returning mode comprises returning the power storage system to a state which existed prior to the power failure and without charging the battery; and
   the second power failure returning mode comprises returning the power storage system to the state which existed prior to the power failure and charging the battery.

9. A power storage system for supplying power to a load and which connects the load to a power generation system, a battery, and a grid, the power storage system comprising:
   a battery management system which controls a charging and a discharging of the battery and which determines a state of charge of the battery; and
   a central controller comprising a duration determination unit which determines a duration of a power failure which occurred in the grid, to determine whether the power failure is an instantaneous failure or a permanent failure, and when the power failure in the grid has ended, performs a power failure returning mode selected from multiple power failure returning modes according to the determined duration of the power failure and the determined state of charge of the battery,
   wherein when the determined duration of the power failure is equal to or more than a standard duration, the duration determination unit determines that the power failure is the permanent failure,
   wherein when the determined duration of the power failure is less than the standard duration, the duration determination unit determines that the power failure is the instantaneous failure, wherein when the determined state of charge of the battery is equal to or more than a standard value, the central controller selects and performs a first power failure returning mode, and wherein when the power failure is the permanent failure and when the determined state of charge of the battery is less than the standard value, the central controller selects and performs a second power failure returning mode.

10. The power storage system of claim 9, wherein, the first power failure returning mode comprises a mode in which a supply of power from the power generation system or the battery to the grid is stopped for a predetermined period of time.

11. The power storage system of claim 9, wherein the second power failure returning mode comprises a mode in which the battery is charged by using power of the power generation system or the grid.

12. The power storage system of claim 9, wherein:
the central controller further comprises a power consumption determination unit which determines an amount of power consumption of the load,
when the determined amount of power consumption of the load is equal to or more than the standard value, the central controller performs a first power failure returning mode in which a supply of power from the battery to the grid is stopped for a predetermined period of time, and
when the determined amount of power consumption of the load is less than the standard value, the central controller performs a second power failure returning mode in which the battery is charged by using power generated by the power generation system or power of the grid.

13. The power storage system of claim 12, wherein the central controller:
detects an amount of the power generated by the power generation system in the second power failure returning mode, and
when the detected amount of the power generated in the power generation system is equal to or more than an amount of power required to charge the battery, controls the power storage system to charge the battery by using the power generated by the power generation system and to supply surplus power remaining after the charging of the battery, from among the power generated by the power generation system, to the load or the grid.

14. The power storage system of claim 12, wherein the central controller:
detects an amount of the power generated in the power generation system in the second power failure returning mode, and
when the detected amount of the power generated in the power generation system is less than an amount of power required to charge the battery, controls the power storage system to charge the battery by using the power generated in the power generation system and the power of the grid.

15. The power storage system of claim 12, wherein the central controller:
detects an amount of the power generated by the power generation system in the second power failure returning mode, and
when the power generation system is not generating power, controls the power storage system to charge the battery by using the power of the grid.

16. The power storage system of claim 9, wherein,
one of the power failure returning modes comprises returning the power storage system to a state which existed prior to the power failure and without charging the battery; and
another one of the power failure returning modes comprises returning the power storage system to the state which existed prior to the power failure and charging the battery.

17. A computer readable recording medium having embodied thereon a computer program for controlling a power storage system which supplies power to a load by connecting the load to a power generation system, a battery, and a grid, said computer readable recording medium containing instructions for:
when a power failure occurs in the grid, determining whether a duration of the power failure between a beginning and an end of the power failure is more than a standard duration;
if the duration of the power failure is more than the standard duration, determining the power failure is an permanent failure;
if the duration of the power failure is less than the standard duration, determining the power failure is an instantaneous failure,
if the power failure is permanent failure, determining whether a charging condition of the battery indicates that a state of charge of the battery is equal to or greater than a standard value;
if the power failure is the permanent failure and the state of charge of the battery is equal to or more than the standard value, performing a first power failure returning mode; and
if the power failure is the permanent failure and the state of charge of the battery is less than the standard value, performing a second power failure returning mode.

18. The computer readable recording medium of claim 17, wherein the first power failure returning mode comprises:
stopping a supply of power from the power generation system or the battery to the grid for a predetermined period of time;
matching a phase of the power generated by the power generation system with a phase of power of the grid; and
after the predetermined period of time has passed, supplying the power generated by the power generation system to the grid or the load.

19. The computer readable recording medium of claim 17, wherein the second power failure returning mode comprises:
determining an amount of power consumption of the load;
when the amount of power consumption of the load is equal to or more than a standard load value, returning to the first power failure returning mode; and
when the amount of power consumption of the load is less than the standard load value, charging the battery.

20. The computer readable recording medium of claim 19, wherein the second power failure returning mode comprises:
determining whether the power generation system is generating power; and
when the power generation system is generating power, comparing an amount of power generated by the power generation system and an amount of power required to charge the battery.

21. The computer readable recording medium of claim 20, wherein the second power failure returning mode further comprises:
when the amount of the power generated by the power generation system is equal to or more than the amount of power required to charge the battery, charging the battery by using the power generated by the power generation system, and supplying surplus power remaining after the charging of the battery, from among the power generated by the power generation system, to the load or the grid.

22. The computer readable recording medium of claim 20, wherein the second power failure returning mode further comprises:
   when the amount of the power generated in the power generation system is less than the amount of power required to charge the battery, charging the battery by using the power generated in the power generation system and a power of the grid.

23. The computer readable recording medium of claim 19, wherein the second power failure returning mode comprises:
   determining whether the power generation system is generating power; and
   when the power generation system is not generating power, charging the battery by using power of the grid.

24. The computer readable recording medium of claim 17, wherein:
   the first power failure returning mode comprises returning the power storage system to a state which existed prior to the power failure and without charging the battery; and
   the second power failure returning mode comprises returning the power storage system to the state which existed prior to the power failure and charging the battery.

* * * * *